(12) United States Patent
Hunt

(10) Patent No.: X5379
(45) Date of Patent: Feb. 19, 1829

(54) KNIFE SHARPENER, & DOMESTIC GUARD

(76) Inventor: Walter Hunt

Walter Hunt
Letters Patent
The schedule referred to in these Letters Patent &
making part of the same containing a de-
scription in the words of the said Walter
Hunt himself of his instrument in a ma-
chine for sharpening carving knives & other
edge tools that require a rough edge de-
nominated The Compound Guard & Knife
Sharpener.

---

The Compound Guard & Knife Sharpener
is constructed as follows. The operators or sharpen
-ing rollers are made of hardened steel about
[illegible] of an inch thick, & near the diameter of a
half-penny less or larger as the case may
require with one corner made sharp, for
each wheel or sharpener in order to occupy
less space in setting the sharpeners they are
cut down from the center of the orifice on
the opposite sides of the wheels so as to allow
the larger half of the rims to pass by each
other about the eighth of an inch more or
less as required, they may be set without
halving the rims but require more
thickness or space in the post or guard
when they are set therefore the half rims
are preferable and are set in a mor-
tice or slit made in the guard shank,
handle or any other part or appendage
of a carving fork, & turn upon pins or
centers in such manner that in using
the wear or friction will be distributed United States Patent Patent No.: X5379 around the whole circumference of the sharpen-
ers. Where the "sharpening rollers" are set in
forks made for the Butchers, they form a
"Guard & Sharpener" being set in the neck
of the fork which may be [illegible]
indicated on the back where the rollers
are set in. In order to set them to ad-
vantage in the common carving fork
the old guard may be removed, & a
new one made of suitable thickness & size
to receive the sharpeners in an opening, or mor-
tise cut thro the same, suspended upon centers
with the lines as aforedescribed partially passing
each other. This mode of putting or attaching the
sharpener to the "carving fork" instead of a stand,
or other appendage, for table use is thought prefer-
able, as it is always at hand, when wanted,
in the act of carving, & the knife becoming sud-
denly dull which often occurs, the edge can be
instantly restored without drawing the fork
from its place, by passing the edge of the knife
between the sharpeners once or twice. When they are
set in the guard in order to hold the sharpeners
firm, press down the guard with the back of the
carving knife raising it with the same when ne-
cessary. For sharpening Butchers knives & other
knives where the fork is not wanted, the sharpen-
ers may be set in a stud, post or handle,
fixed in a stand, bench or otherwise as may
be required, & suspended upon centers as in
the fork.

The manner of using it being apparently
the same in a handle or fork, they must be held firm in one hand & the knife drawn with the edge
between the rollers, the sharp corners of which are
set from the draught of the knife as it is
drawn thro' with sufficient pressure for
them to cut off the steel in their shavings
from the sides of the edge of the knife
rendering sharp as required.
What I particularly claim in this im-
provement as my invention or discovery is
the form of the sharpener for the aforesaid
purposes being the circular plates re-
quiring but little space or room, easy to be
repaired, & trifling in expense, & still fur-
ther I claim as my right of invention the
fixing connections, or attaching sharpen-
ers to the carving fork or any appen-
dage thereof either for the double pur-
pose of guard & sharpener, or for the
single purpose of a sharpener.
New York Jany 23rd 1827.

Witnesses
Shepherd [illegible]
[illegible] Walter Hunt
[illegible]

[illegible] and recorded anew
January 25th 1875.